Figure 1:
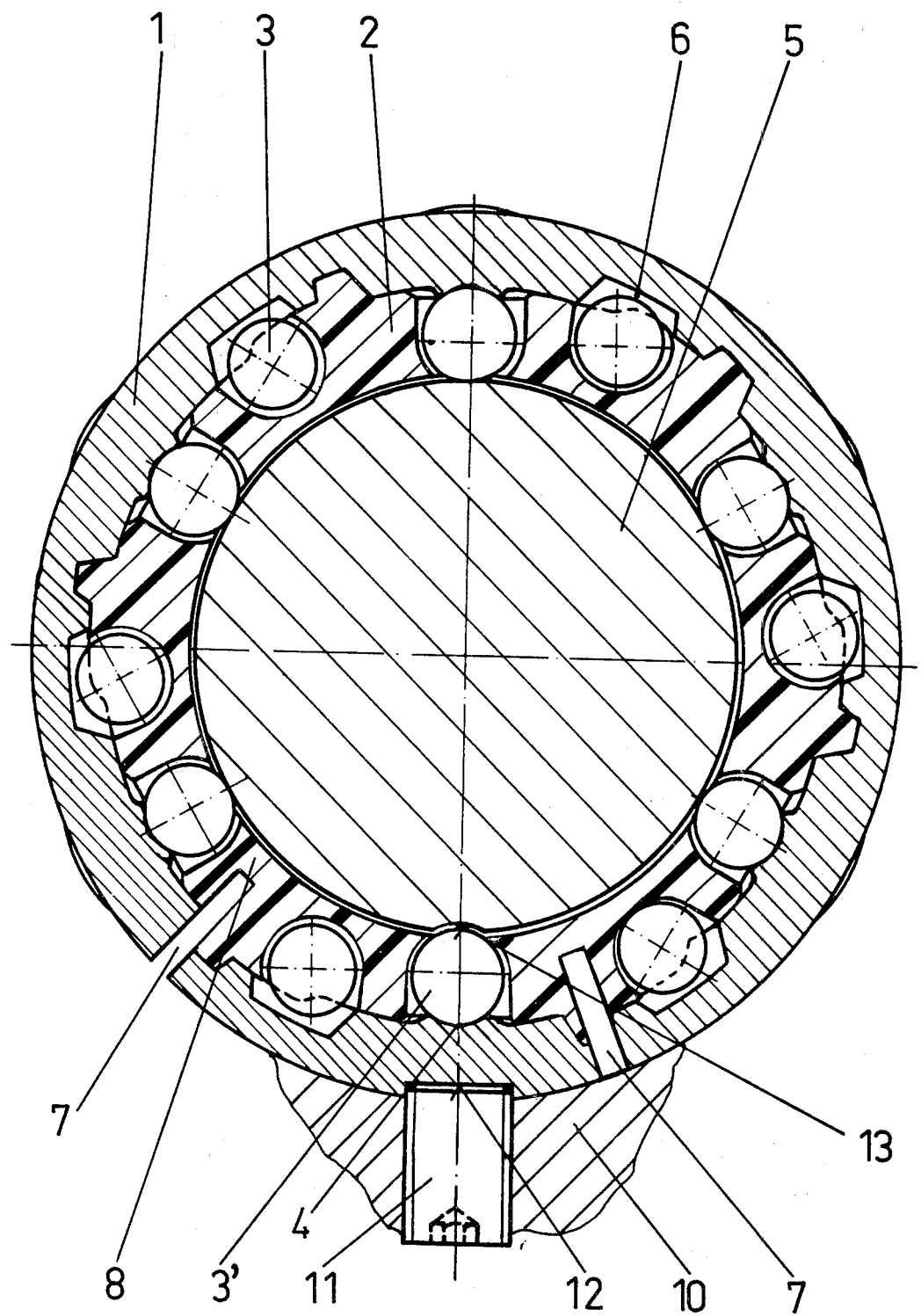

United States Patent [19]
Olschewski et al.

[11] 4,423,911
[45] Jan. 3, 1984

[54] ROLLING BEARING FOR LENGTHWISE MOVEMENT

[75] Inventors: Armin Olschewski, Schweinfurt; Manfred Brandenstein, Eussenheim; Lothar Walter, Schweinfurt; Horst M. Ernst, Eltingshausen; Walter Reith, Bad Bocklet, all of Fed. Rep. of Germany

[73] Assignee: SKF Kugellagerfabriken GmbH, Schweinfurt, Fed. Rep. of Germany

[21] Appl. No.: 317,502

[22] Filed: Nov. 2, 1981

[30] Foreign Application Priority Data

Nov. 7, 1980 [DE] Fed. Rep. of Germany ... 8029743[U]

[51] Int. Cl.³ .......................................... F16C 29/06
[52] U.S. Cl. .................................................. 308/6 C
[58] Field of Search ............. 308/6 C, 6 R, 6 A, 4 R, 308/3 R

[56] References Cited

U.S. PATENT DOCUMENTS 4,139,242 2/1979 Ernst et al. .......................... 308/6 C
4,312,545 1/1982 Blaurock et al. ................... 308/6 C

FOREIGN PATENT DOCUMENTS 2834209 2/1980 Fed. Rep. of Germany .
2849758 5/1980 Fed. Rep. of Germany .

Primary Examiner—Lenard A. Footland
Attorney, Agent, or Firm—Daniel M. Rosen

[57] ABSTRACT

A rolling bearing assembly for lengthwise movement with respect to a shaft has an outer sleeve with internal races, and a cage guiding endless rows of rolling bodies in the bore of the outer sleeve. The cage has a slit extending axially and radially therethrough, and the cage portion aligned with the slit is radially moveable, so that an entire row of rolling bodies adjacent said slit may be radially moved into a race formed in a shaft in the bearing. The sleeve may have a second slit spaced from the first slit. The second slit may be only partial, to define a region of bending, or may extend completely through the outer sleeve to define a segment, with the first slit, that is radially moveable.

5 Claims, 2 Drawing Figures

ROLLING BEARING FOR LENGTHWISE MOVEMENT

BACKGROUND OF THE INVENTION

This invention relates to a rolling bearing for lengthwise movement along a shaft, wherein at least one axially extending race is formed in the shaft. Such bearings are comprised of an outer housing with axially extending races in its bore. The rolling bodies of a circumferential distributed endless row of rolling bodies are arranged in the race. A cage is assembled in the outer housing for guiding the rolling bodies. In the type of rolling bearing to which the present invention is directed, at least one axially extending slit is provided in the outer housing, the slit being in the region in the endless rolling body row that engages the race formed in the shaft.

A rolling bearing for lengthwise movement of this type has been disclosed in DE-OS No. 2,834,209. This arrangement has a wide axially and radially extending slit extending therethrough. A separate insert is intentionally assembled in this slit, the insert having an endless rolling body row engaging an axially extending race in the shaft. Although in this arrangement turning moments are satisfactorily transmitted between the shaft and bearing, the arrangement is very expensive to produce.

A torque transmitting ball bearing arrangement is also disclosed in DE-OS No. 2,849,758, wherein the loaded race section of the outer sleeve, with one or two ball rows, can be adjusted radially with a set screw. A particular disadvantage of this arrangement is that only one part of the essentially endless race, and thereby only one part of the respective ball row, can be adjusted, while the remaining balls and race parts remain in their positions. Thereby it is not insured that the balls in the entire adjustment region are adequately guided in their entry and exit from the loaded race groove. As a result, abrasion and loud noise occurs at the transition points, and the bearing arrangements can prematurely fail or must be designed on the basis of a minimum average useful life.

The present invention is therefore directed to the production of a rolling bearing for lengthwise movement of the above type, which does not employ a specially constructed insert for the transmission of torque, and in which the race of the ball bearing row that transmits the torque is not changed by the radial adjustment.

In accordance with the invention this object is achieved by providing a rolling bearing in which the slit of the outer housing is in the form of a smaller slit axially extending through the outer housing. In this arrangement the rolling bodies of the cage which guide the endless rolling body rows, and also the rolling bodies of the endless rolling body rows, function to transfer the turning moments. The portion of the cage in the region adjacent the slit holds the cage together, and is adjustable in the radial direction with adjustable portion of the outer shell. In addition, the entire rolling body row adjacent at the time to the separating slit is radially adjustable with respect to the axially extending race of the shaft.

The rolling bearing for lengthwise movement preferably has two, slits axially extending therethrough, on opposite sides of a rolling body row, although, as will be discussed later, a slit adjacent only one side of the row may alternatively be employed. These slits are very narrow, so that the relative distance between the rolling body rows, in comparison with a non-slit bearing arrangement, is not changed. The segment between the two separation slits is unitary, and consists, as in the other rolling bodies, as well as a part of the cage. Advantageously the entire segment of the rolling bearing can be radially displaced for the adjustment with respect to the race of the shaft, for the purpose of the torque transmission. In the entire adjustment region the component parts of the segment remain in their positions with respect to one another, so that the running characteristics are as good as in the known rolling bearings. As a result the compact form in the region of the slit connection portion of the cage is suitably maintained, thereby limiting the separation of the individual parts of the bearing from one another. The bearing is also so formed that the radial displacement of the segment is only slight impeded. In the assembled condition the displacement and therewith the adjustment can be effected by means of one or more screws or the like arranged to extend radially in the housing. If, in a determined application, only a small radial adjustment is desired, a single separation slit may suffice so that the rolling body row adjacent the separation slit can be radially adjusted in as a result of the elastic bending characteristics of the outer sleeve.

In accordance with a further feature of the invention the connection portions of the cage are formed as bending webs or bridges in the slits of prefabricated and assembled rolling bearing for lengthwise movement. Preferably the separation slits are formed from the outside in, for example by the use of a saw or the like. The outer sleeve is fully separated, the cage, however is only slit sufficiently deep that a thin connecting web remains throughout the entire axial length of the cage. The elasticity that remains is sufficient, especially in plastic cages, in order to enable the necessary radial displacement of the adjacent rolling body row. The subsequent slitting of a rolling bearing for lengthwise movement of conventional form is especially advantageous for economical preparation and mounting of the bearing, since the production up to the time of forming the slits can be the same in both cases.

In another embodiment of the invention the connection portions of the cage are formed, in the production of the cage, in the form of a hinge. As a consequence an especially easy movement of the connection portion in the radial direction is produced while the cage is securely held together and the rolling body rows are precisely positioned.

In accordance with a further feature of the invention a further axial slit is provided next to the above mentioned separation slit. This further axial slit extends only part way radially through the outer sleeve. This embodiment is especially useful in the case in which a large radial adjustment opposing the operating force is necessary, wherein the adjustment region of a singely slit arrangement would not suffice.

In another embodiment of the invention wherein segments of the outer sleeve are insured from falling out, the separating slits are radially inclined one to the other to effect a self holding of the segment in the outer ring. This results in the production of a holding arrangement in the slide guide in a machine tool assembly, also known as a "swallow tail" holding arrangement, which advantageously requires only the inclined construction of the separation slits for holding the elements together, without the aid of other elements.

In order to inhibit the accumulation of dirt, in a further application of the invention, the separation slits may be filled with a soft elastic material.

In accordance with the invention, a rolling bearing for lengthwise movement is produced that with minimum expense, can be produced among other things from the conventional construction, and in addition retains its pecision.

Figure 2:
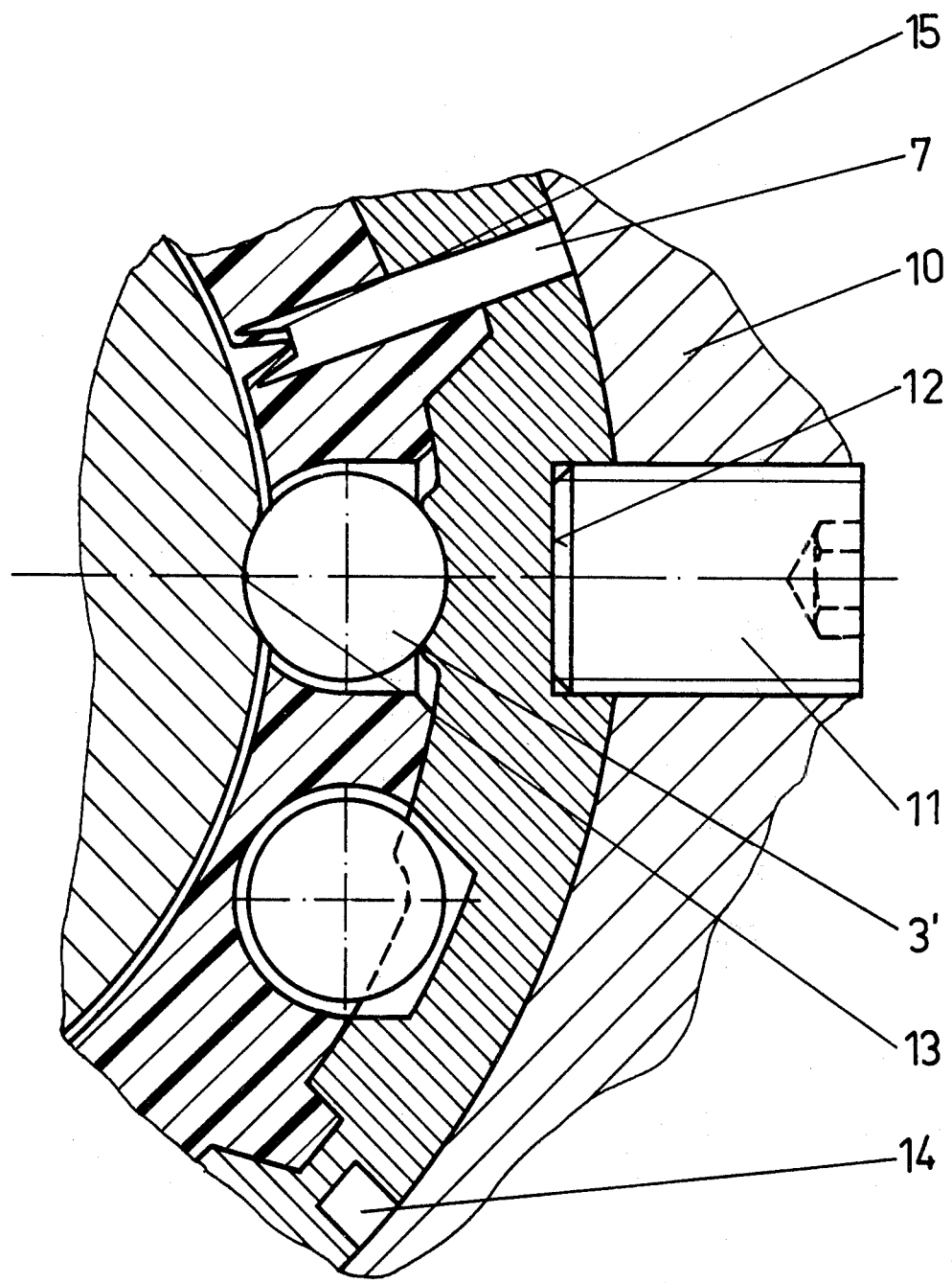

In order that the invention will be more clearly understood it will now be disclosed in greater detail with reference to the accompanying drawings wherein:

FIG. 1 is a cross-sectional view of a rolling bearing for lengthwise movement, in accordance with the invention, and having two separation slits; and FIG. 2 is an enlarged cross-sectional view of a part of a rolling bearing for lengthwise movement in accordance with a further embodiment of the invention, having a single separating slit, a preferred bending location, and a hinge as the connecting portion.

The rolling bearing for lengthwise movement on a shaft illustrated in FIG. 1 is comprised of an outer sleeve 1 having axially extending races 4 and 6 in its bore. The bearing is also comprised of a cage 2, and six endless ball rows 3. The balls of these rows run in a loaded ball zone 4 between a shaft 5 and the outer sleeve 1. From the loaded zone 4 the balls are turned around in an end ring (not shown) to run in the return race 6 of the outer sleeve 1, and are reinserted to run again in the loaded zone 4 by means of a further end ring (not illustrated). The outer sleeve 1 and the end rings are provided with two axially extending separating slits 7, so that a separated segment is formed in the sleeve with races for the ball row 3. The cage 2 is slit in the radial direction only sufficiently deep that an elastic connecting bridge 8 remains. This enables the cage to hold its shape. A screw 11 is arranged in the housing 10 or other support. The screw engages the surface 12 of the separated segment, so that the whole segment is radially movable. In operation the balls in the ball row 3 in the loaded zone 4 engage an axially extending race 13 formed in the shaft 5. As a result the interconnecting webs 8 are elastically deformed. If necessary two or more similar arrangements may be provided.

In the ball sleeve illustrated in FIG. 2, instead of the second slit extending completely through the outer shell as shown in FIG. 1, one of the slits 14 in the outer housing, for producing a line along which the segment may be bent by radial forces from the screw 11. The resultant weakening of the material enables the outer shell to be bent, preferably elastically, along this line to its new position. The connecting element of the cage aligned with the separating slit 7 is formed as a hinge 15 in the production of the plastic cage.

The embodiments of the invention illustrated in the drawings, especially with respect to the type of connecting elements, are only examples, and it is obvious that other solutions may be substituted therefor. It is therefore intended in the following claims to cover each such variation and modification as falls within the true spirit and scope of the invention.

What is claimed is:

1. In a rolling bearing for lengthwise movement with respect to a shaft, wherein the bearing is comprised of an outer sleeve with axially extending races in its bore, a plurality of endless rows of rolling bodies in said bore, and a cage in said sleeve for guiding said rolling bodies to roll in said races in a plurality of circumferential distributed endless rows of which first portions are loaded rolling body portions, said sleeve having an axially extending slit, and wherein a rolling body row adjacent said slit is adapted to engage an axially extending race formed in said shaft for transmission of torque between said shaft and bearing, the improvement wherein said slit extends axially and radially completely through said outer sleeve, said cage having connecting means aligned with said slit that permits radial displacement of the cage adjacent said slit while holding said cage together, the first portion of a row of rolling bodies immediately adjacent said slit being radially moveable to entirely engage said axially extending race formed in said shaft, whereby the rolling bodies of the entire respective first portion of said rolling bodies row adjacent said slit transmit torque between said shaft and bearing, said connecting means of said cage comprising a bendable interconnecting web aligned with said slit.

2. The rolling bearing of claim 1 wherein said outer sleeve has a second slit that extends axially and radially completely through said sleeve and is spaced from said first mentioned slit, said first mentioned and second slits extending in planes inclined to the radial direction of said bearing, whereby the segment defined between said slits is held in said bearing.

3. The rolling bearing of claim 1 wherein said connecting means of said cage comprises hinge means formed in said cage permitting bending of said cage in a radial direction.

4. A rolling bearing of claim 1 comprising a second slit in said outer sleeve, said second slit extending axially and spaced from said first mentioned slit and extending only partially radially through said outer sleeve.

5. The rolling bearing of claim 1 wherein said outer sleeve has a second slit defining, with said first mentioned slit, a segment that is radially moveable, and means for affixing said segment to said cage.

* * * * *

UNITED STATES PATENT AND TRADEMARK OFFICE
CERTIFICATE OF CORRECTION

PATENT NO. : 4,423,911

DATED : January 3, 1984

INVENTOR(S) : ARMIN OLSCHEWSKI, ET AL

It is certified that error appears in the above—identified patent and that said Letters Patent is hereby corrected as shown below:

In col. 1, line 16, change "in" to --of--;
line 29, insert a hyphen between "torque" and "transmitting";
line 59, insert --the-- after "with";
line 65, delete the comma after "two".
In col. 2, line 5, insert --rolling body rows, of a part of the outer sleeve with races for the loaded zone, the return race, and the turnaround races for the--;
line 26, delete "in";
line 30, insert --the-- after "of";
line 34, change "separated," to --separated;-- and insert a comma after "however";
line 35, insert --so-- after "deep";
line 59, change "singely" to --singly--;
line 64, insert a hyphen after "self".
In col. 3, line 9, change "from" to --by--;
line 42, change "3" to --3'--;
line 49, isnert --the outer sleeve extends only partwise radially through-- after "slits 14 in", and change "housing," to --sleeve,--.
In col. 4, line 1, change "in the" to --during--.
line 16, change "circumferential" to --circumferentially--.

Signed and Sealed this

Twenty-third Day of October 1984

[SEAL]

Attest:

GERALD J. MOSSINGHOFF

Attesting Officer

Commissioner of Patents and Trademarks